United States Patent [19]

Boyajian

[11] 4,058,893

[45] Nov. 22, 1977

[54] BOLT CUTTER

[76] Inventor: Alfred Z. Boyajian, P.O. Box 811, Manhattan Beach, Calif. 90268

[21] Appl. No.: 699,664

[22] Filed: June 25, 1976

[51] Int. Cl.$^2$ .............................................. B26B 13/26
[52] U.S. Cl. ......................................... 30/250; 30/92; 30/189
[58] Field of Search ................... 30/92, 249, 250, 188, 30/189

[56] References Cited

U.S. PATENT DOCUMENTS

| | | | |
|---|---|---|---|
| 401,308 | 4/1899 | Selleck | 30/227 |
| 993,646 | 5/1911 | Burkett | 30/250 |
| 1,469,467 | 8/1923 | Wagenbach | 30/250 X |
| 1,831,447 | 11/1931 | Heinrich | 30/227 |
| 2,319,558 | 5/1943 | Romanoff | 30/189 |
| 2,385,835 | 10/1945 | Neal | 30/250 |
| 2,647,312 | 8/1953 | Neal | 30/189 |
| 2,682,795 | 7/1954 | Neal | 30/250 X |
| 2,874,465 | 2/1959 | Sillak | 30/250 |

Primary Examiner—Jimmy C. Peters
Attorney, Agent, or Firm—Dike, Bronstein, Roberts, Cushman & Pfund

[57] ABSTRACT

A cutter comprising a first rigid elongate bar, a second shorter bar pivotally mounted on the first bar with an end of the longer bar and an end of the shorter bar coinciding for pivotal movement about an axis spaced from the coinciding ends, said coinciding ends embodying opposed cutting edges movable relative to each other for receiving a part for shearing, a lever arm pivotally mounted on the first bar for rotation thereon about a pivot spaced from the pivot connecting the first and second bars and cam elements on the lever arm and at the distal end of the second bar mutually engageable by swinging the lever arm about its pivot to effect relative movement of the opposed cutting edges to first apply a high shearing force at a relatively low speed between the cutting edges at the beginning of the blade movement and thereafter a lower shearing force at a relatively high speed through the remainder of the cutting movement.

8 Claims, 12 Drawing Figures

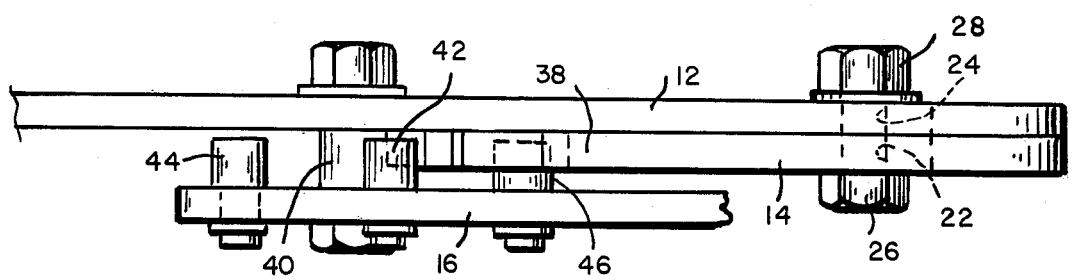
FIG. 5
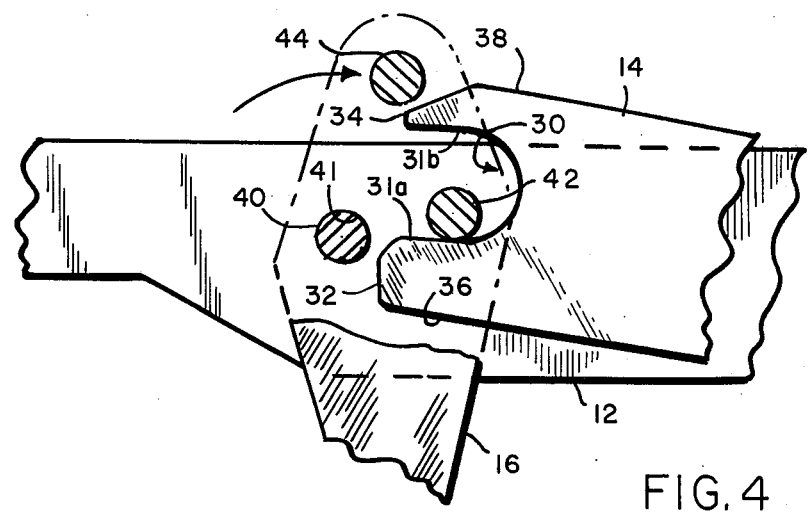
FIG. 4
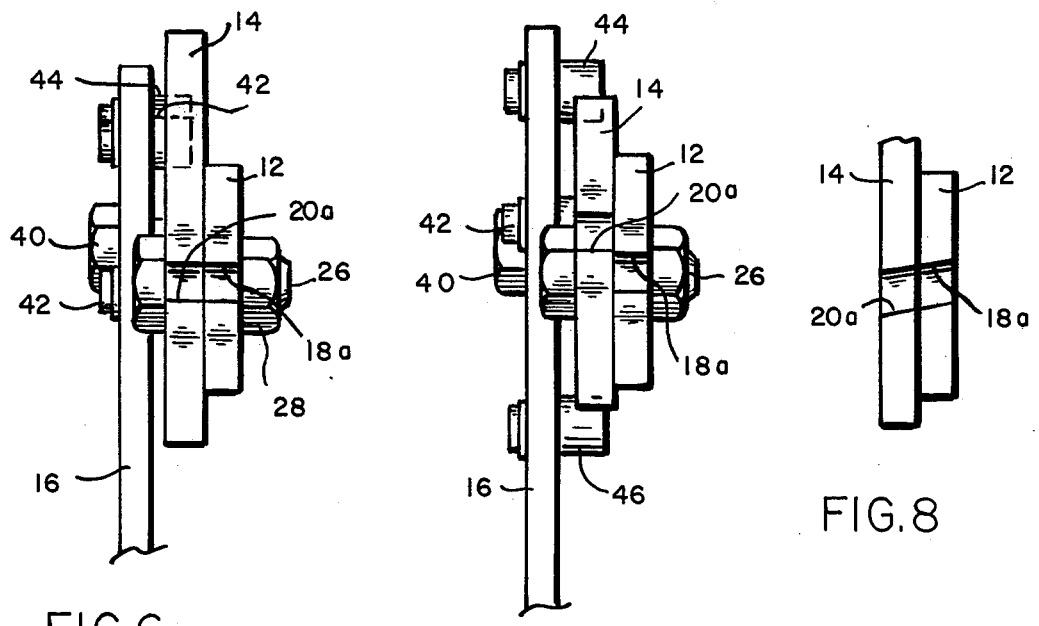
FIG. 6
FIG. 7
FIG. 8

BOLT CUTTER

BACKGROUND OF THE INVENTION

In my Pat. Nos. 3,585,662 and 3,716,879, there are shown tools for cutting and bending rods, chain links, wires and the like wherein there are two pivotally connected bars provided with cooperative cutting edges and a lever pivotally connected to one of the bars for effecting pivotal movement of the two bars relative to each other to shear a part placed between the cutting edges. In the aforesaid tool, the entire shearing force is provided by a lever and single force-transmitting pin fixed to the lever at a fixed radial distance from the pivot axis of the lever. This requires that either the cutting pressure be sacrificed to provide sufficient blade travel to cut through large diameter stock, or that long blade travel be sacrificed to obtain an initial high cutting pressure to enable cutting through very hard, tough, large gauge stock. It is the purpose of this invention to provide a tool with both advantages, to wit, an initial high cutting pressure at a relatively slow speed to provide for cutting hard, tough stock, and also a long blade travel at a relatively high speed for cutting all the way through large gauge stock. Other advantages over known cutting tools are derived from the fact that the closing of the cutting edges on the part to be cut serves to retain the part between the blades in contrast to scissors-type cutters which tend to expel a part from between them, and the fact that the tool provides for a wide range of cutting from large diameter reinforcing steel rod and cables to fine wires and insulation materials and the like.

SUMMARY OF THE INVENTION

A cutter comprising a rigid bar having at one end a cutting edge intermediate its opposite longitudinal edges facing in a predetermined direction, a second rigid bar having at one end a cutting edge intermediate its opposite longitudinal edges facing in a direction opposite to said first cutting edge, pivot means pivotally connecting the two bars for pivotal movement relative to each other to move the cutting edges toward and away from each other, means for effecting pivotal movement of the bars relative to each other from a position in which the edges are separated for receiving the part to be sheared to a position in which they overlap comprising a lever arm pivotally mounted on the first bar on a pivot spaced from the pivot connecting the second bar to the first bar, and with a portion of the pivot arm situated between the pivots such as to overlap the distal end of the second bar, and first and second force-producing elements fixed to the lever arm forwardly of its pivot axis at different radial distances from the pivot axis for engagement successively with the distal end of the second bar to apply successively to the second bar a first high shearing force at a relatively low speed and thereafter a lesser shearing force at a relatively high speed throughout the remainder of the cutting blade movement. The cutting edges may be, but are not necessarily, parallel and inclined with respect to the longitudinal axis of the bars and the force-transmitting elements are pins fixed to the lever arm perpendicular thereto and parallel to the pivot axis of the lever arm, there being three such pins arranged about the pivot axis at different radial distances, two of which provide for applying the shearing force and the third for retraction. The distal end of the second bar contains a recess inclined to the longitudinal axis of the bar at approximately the same angle as that of the cutting edge at the pivoted end of the bar within which one of the pins is always engaged. The other two pins are arranged to be brought into engagement with the distal end of the second bar at the opposite sides.

The invention will now be described in greater detail with reference to the accompanying drawings, wherein:

FIG. 4 is a fragmentary plan view of the tool with the lever arm omitted to show the force-producing elements;

FIG. 5 is a fragmentary elevation showing the disposition of the parts as in FIG. 1 of the tool;

FIG. 6 is an end view of the cutting blades shown in FIG. 1;

FIG. 7 is an end view taken on the line 7—7 of FIG. 2;

FIG. 8 is an end view taken on the line 8—8 of FIG. 1;

Figure 1:
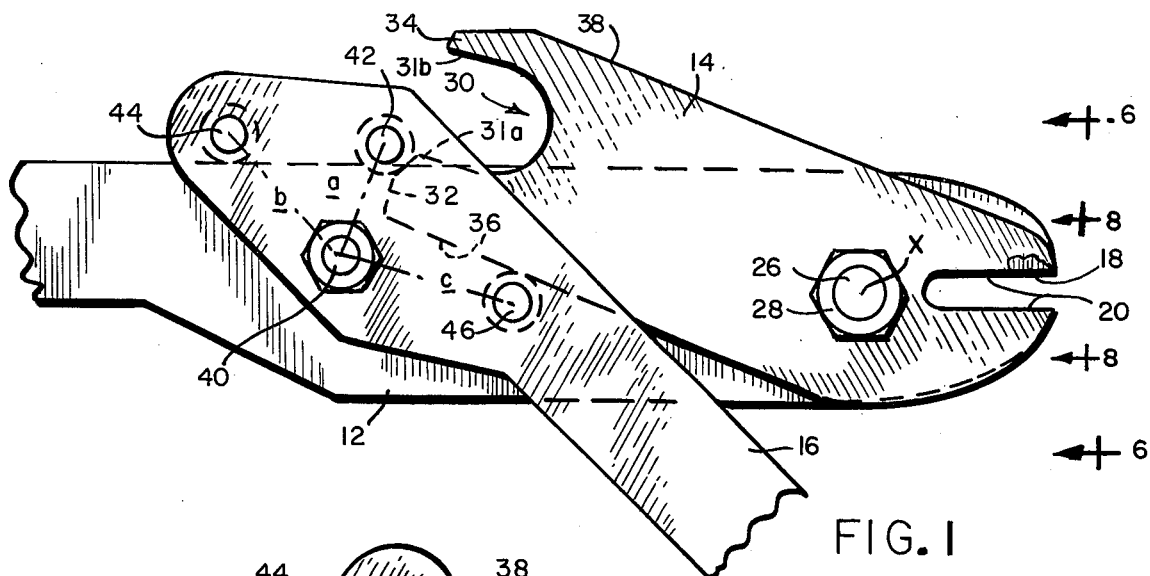
FIG. 1 is a plan view of the tool showing the shearing elements in a position to receive a part to be sheared.

As herein illustrated, the cutter in one form, FIGS. 1 to 8 inclusive, comprises as essential component parts rigid elongate cutter bar 12, a rigid shorter cutter bar 14 and a force-applying lever arm 16. The cutter bar 12 has at one end a relatively deep U-shaped notch 18, the axis of which coincides approximately with the longitudinal center line of the bar and of a size to receive the part to be sheared, but may be offset with respect thereto. The cutter bar 14 has a U-shaped notch 20, the axis of which may be inclined to the longitudinal center line of the bar 14 at an angle of approximately 20° which corresponds in size to the U-shaped notch 18. The two cutter bars are pivotally connected to each other with their notched ends coinciding for pivotal movement relative to each other about an axis X spaced from the bottom of the notches. For this purpose, the cutter bars are provided with holes 22, 24, respectively, for receiving a pivot bolt and nut 26, 28. Pivotal movement of the bars relative to each other is designed to effect movement of the notches 18, 20 from a position of registration with each other, in which position a part to be sheared can be entered into the notches to laterally offset position for applying a shearing force to the part. To effect shearing movement of the cutter bar 14 relative to the cutter bar 12, the cutter bar 14 is provided at its distal end with an open end recess 30 which is of generally U-shaped configuration, the axis of which is inclined at an angle of approximately 20° to the longitudinal center line of the cutter bar 14. The recess 30 is bounded at opposite sides by tines 32, 34, both of which taper towards their ends.

The inner side of the tines constitute the opposite inner sides of the recess 30, providing a primary power cam surface 31a and retraction cam 31b, and the outer sides 38, 36 of the tines constituting, respectively, a secondary power cam and a secondary retraction cam.

The force-applying lever arm 16 is pivotally mounted for rotation about an axis spaced from one end on a pivot stud 40 fixed to the cutting bar 12 near its longitudinal center line at a distance from the axis of the pivot bolt 26 corresponding substantially to the length of the cutter bar 14 from the pivot bolt 26 to the distal end of the cutter bar 14 so that as the cutter bar 14 is pivoted relative to the cutter bar 12, its distal end just clears the pivot stud 40. The pivot hole 41 (FIG. 4) for receiving the pivot stud 40 preferably is located close to the left longitudinal side of the lever arm 16 and spaced from the end so that the portion of the lever arm 16 beyond the pivot stud 40 overlaps the distal end of the cutter bar 14. Three force-transmitting pins are fixed to the lever arm 16, a pin 42 located on a line drawn through the stud 40 approximately 40° to 50° to the center line of the lever arm in a direction toward the proximal end of the lever arm, a pin 44 at the left longitudinal side on a line extending from the axis of the pivot stud 40 parallel to the longitudinal side and a pin 46 located on a line drawn through the stud 40 approximately 45° to the center line of the lever arm in a direction across the lever arm on a line extending from the axis of the pivot stud toward the distal end of the lever arm. The pin 42 is at a radial distance $a$ from the pivot axis, the pin 44 at a greater radial distance $b$ from the pivot axis and the pin 46 another radial distance $c$ from the pivot axis. The locations of the pins are such that the pin 42 operates in recess 30 on the cam surface 31a, the pin 44 operates on the outer cam surface 38 and the pin 46 operates on the outer cam surface 36.

Figure 2:
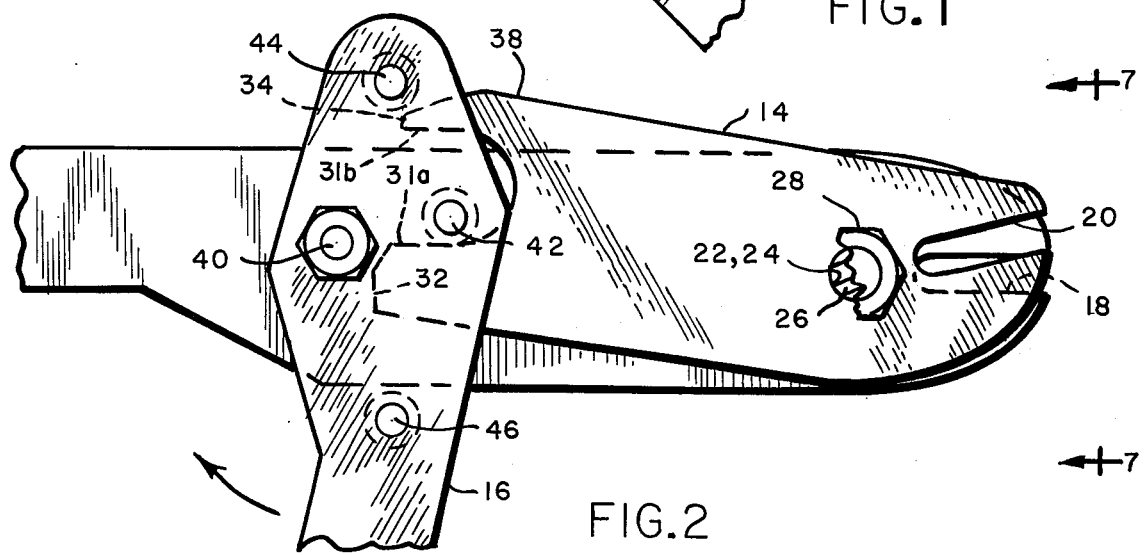
FIG. 2 is a plan view of the tool showing the shearing elements at an intermediate stage of shearing.
Figure 3:
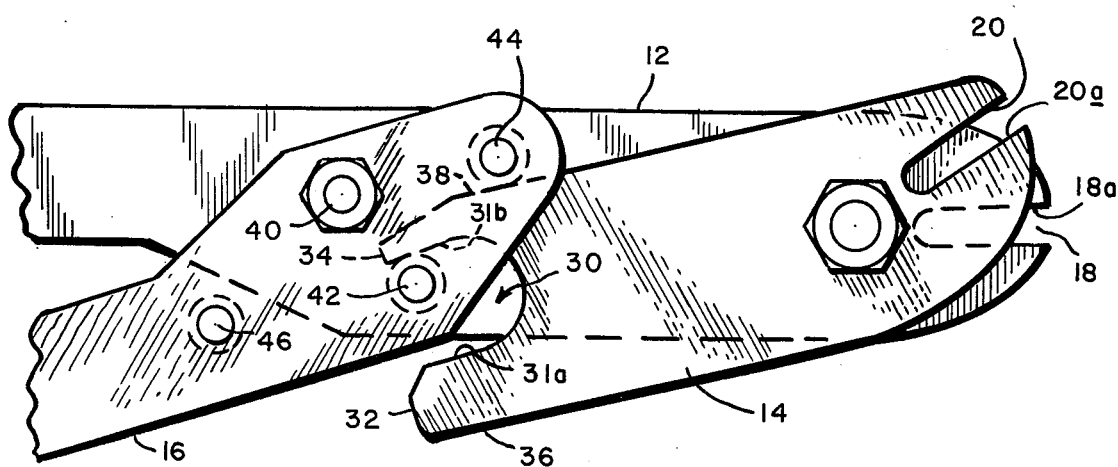
FIG. 3 is a plan view of the tool showing the position of the shearing elements following completion of the shearing operation.

As thus constructed, by swinging the lever arm 16 counterclockwise about the pivot stud 40 to the position shown in FIG. 1, the pin 46, by engagement with the outer cam surface 36, will swing the cutter bar 14 clockwise to bring the cutting edges into alignment, in which position a part to be sheared can be placed between the cutting edges. Shearing is effected by swinging the lever arm 16 clockwise, which first disengages the pin 46 from the outer cam surface 36 and then engages the pin 42 with the cam surface 31a of the recess 30, and because the radius of the pin 42 from the pivot axis of the stud is short in comparison to the length of the lever arm, a very high shearing force at a relatively low speed is initially applied to the part as the pin travels along the cam surface 31a of the recess 30 which is desirable to start the shear. As the lever arm continues to be swung clockwise, the pin 42 leaves the cam surface 31a of the recess and the pin 44 comes into engagement with the outer cam surface 38 at the left side of the recess 30, applying a lesser shearing force at a relatively high speed because it is located at a greater radial distance from the pivot axis, to complete the shearing of the part. The relative positions of the component parts at the start of the shear, where the pin 42 has engagement with the cam surface 31a of the recess 30, where it leaves the side and where the pin 44 commences to have engagement with the outer side 38 and its final position are shown in FIGS. 2, 3 and 4.

The sides of the U-shaped notches which constitute the cutting edges are the side 17a and 20a (FIG. 6). The surfaces of these edges are inclined 10° to the plane of shearing which is in the plane of engagement between the two bars. Since the cutting edges 18a and 20a are laterally offset with respect to the pivot axis unlike scissors wherein the cutting edges commence to become engaged from the pivot axis toward the ends of the blades, the cutting edges of the cutter herein described commence to become engaged at the ends of the cutting edges and progressively come together toward the pivot axis. The effect of this is twofold in that the maximum shear is applied at the outset which is desirable to initiate the cutting operation and that the progressive closing of the openings between the cutting edges from the outer ends locks the part in so that it cannot be ejected as frequently happens with a conventional scissors-type cutter. Thus, when the maximum effort is desired, the parts are firmly held and the greatest mechanical advantage is provided.

Figure 9:
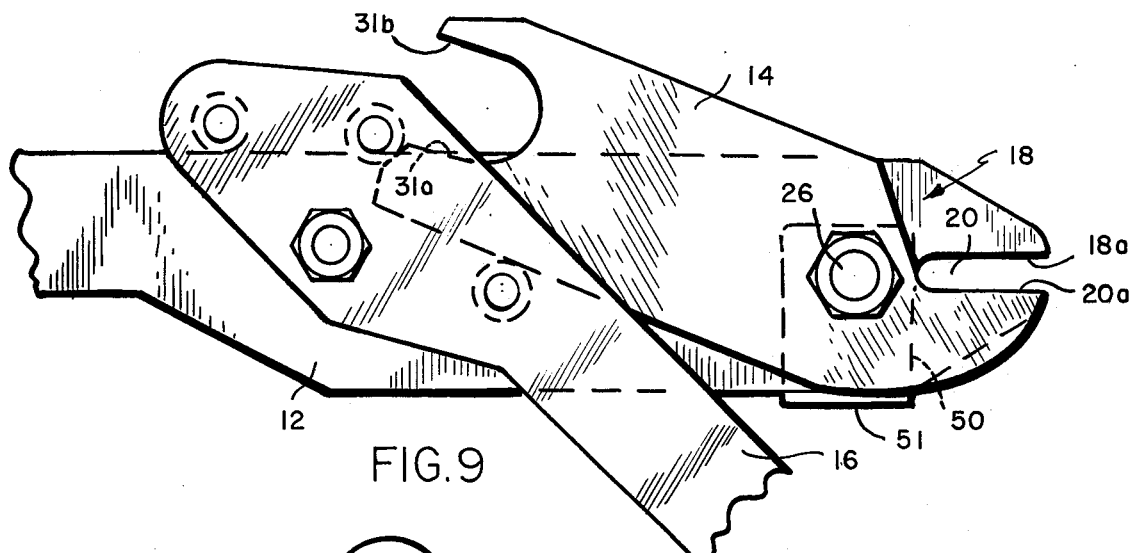
FIG. 9 is a fragmentary plan view of an alternative form of the tool showing the cutting elements in a position to receive a part to be sheared.
Figure 10:
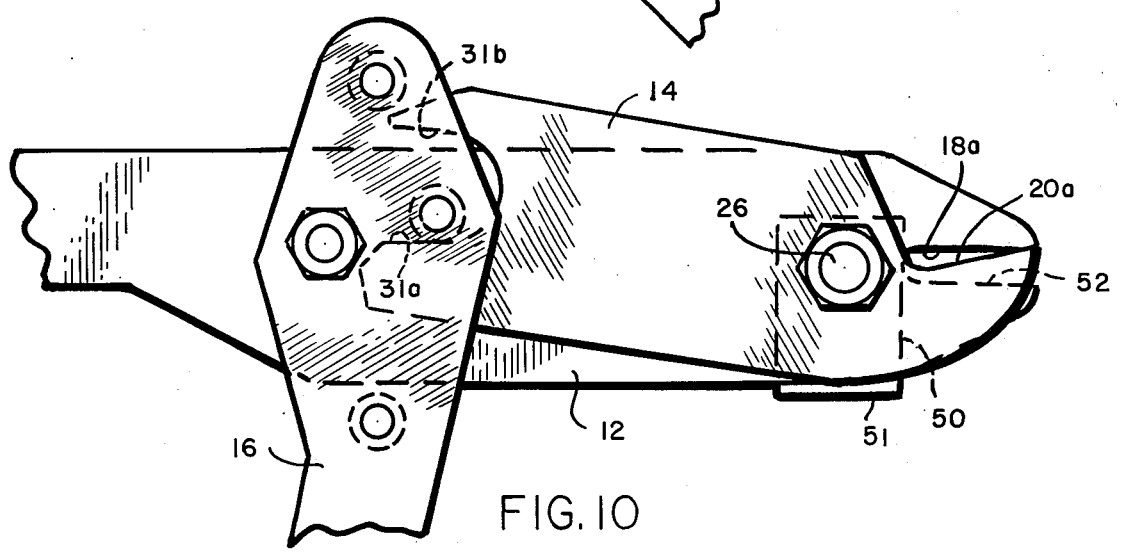
FIG. 10 is a fragmentary view like that of FIG. 9 showing the shearing elements at an intermediate stage of shearing.
Figure 12:
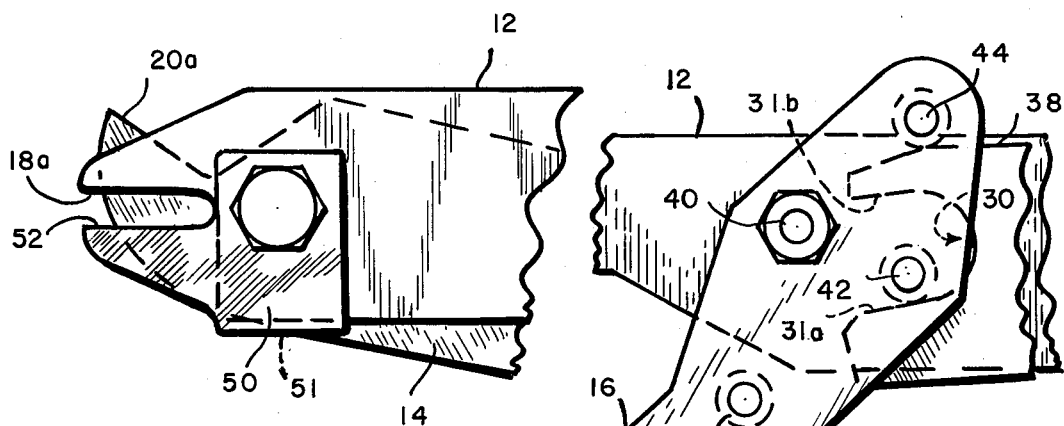
FIG. 12 is a fragmentary plan view of the tool showing the position of the shearing element following completion of the shearing operation.
Figure 11:
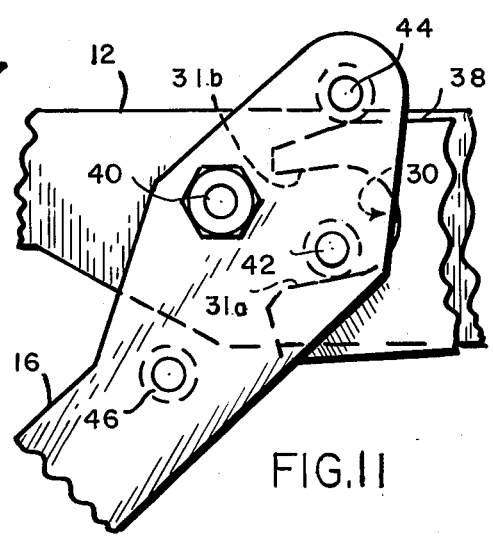
FIG. 11 is a fragmentary plan view of the force-transmitting elements at the stage wherein the secondary cam takes over from the primary cam.

Alternatively, as shown in FIGS. 9 to 12 inclusive, the cutting edges 18a, 20a are provided for by open notches 18 and 20, the opposite sides of which are divergent rather than parallel. The shearing action of these cutting edges is the same as that provided for in FIGS. 1 to 9 inclusive with the advantage that the cutting edges may be easier to manufacture. The successive positions of the cutting edges with respect to each other for receiving and shearing a part are illustrated in FIGS. 9 to 12. The transfer of the shearing force from the primary cam 31a to the secondary cam 38 is most advantageous for large diameter workpieces when the line connecting the center of the force-transmitting pins 42, 44 is approximately at right angles to the longitudinal center line of the cutting bars 12 and 14. The modified form also differs in that it is provided with a flanged keeper plate 50 which is secured to the cutter bar 12 on the pivot bolt 26. The flange 51 prevents the keeper plate from rotating. The keeper plate provides a fixed edge 52 opposite the cutting edge 18a which prevents the part to be sheared from tilting as the shearing force is applied. In other respects, the tool shown in FIGS. 9 and 12 is the same as that shown in FIGS. 1 to 9.

It should be understood that the present disclosure is for the purposes of illustration only and includes all modificiations or improvements which fall within the scope of the appended claims.

I claim:

1. A cutter comprising a rigid bar having at one end a cutting edge intermediate its opposite longitudinal edges facing in a predetermined direction, a second rigid bar having at one end a cutting edge intermediate its opposite longitudinal edges facing in a direction opposite said first cutting edge and at its other end a recess, pivot means pivotally connecting the two bars for pivotal movement relative to each other to move the cutting edges toward and from each other, means for effecting pivotal movement of the bars relative to each other from a position in which the edges are separated for receiving the part to be sheared to a position in which they overlap comprising a lever arm pivotally mounted on the first bar on a pivot spaced from the pivot connecting the second bar to the first bar and with a portion of the lever arm situated between the pivots such as to overlap said other end of the second bar, and first and second force-producing elements fixed to the lever arm forwardly of its pivot axis at different radial distances from the pivot axis arranged to be brought into engagement with the other end of the second bar at outer sides of the recess and within the recess to effect relative movement of the cutting edges toward each other at a relatively slow speed at the beginning of the blade movement to apply a high cutting pressure and thereafter a lower cutting pressure at a relatively high speed throughout the remainder of the blade movement.

2. A cutter according to claim 1 wherein there are three force-transmitting elements fixed to the lever arm, one of which is situated at a predetermined radial distance from the axis within the recess, another of which is situated at a greater radial distance from the axis and is movable into engagement with the end at one side of the recess by rotation of the lever in one direction and a third which is situated at the handle side of the pivot and is movable into engagement with the distal end at the other side by rotation of the lever in the opposite direction.

3. A cutter according to claim 1 wherein said force-transmitting elements are cylindrical pins fixed to the lever arm and parallel to the pivot axis of the lever arm.

4. A cutter according to claim 2 wherein the pin at the shortest radial distance initiates the shearing operation and the pin at the intermediate radial distance consummates the shearing operation.

5. A cutter according to claim 2 wherein the pin at the shortest radial distance and the pin at the handle side of the pivot limits the retraction of the lever arm to a position wherein the cutting edges are in registration.

6. A cutter according to claim 2 wherein the pin at the shortest radial distance and the pin at the intermediate radial distance limit the shearing movement of the lever arm.

7. A cutter according to claim 1 comprising a keeper affixed at the end of the first bar having an edge spaced from and parallel to the cutting edge thereof and a means engaged with the longitudinal edge of the first bar which prevents rotation of the keeper.

8. A cutter according to claim 1 comprising a flat rigid keeper plate fixed to the outer side of the first bar having an edge spaced from and parallel to the cutting edge of the first bar and a flange in engagement with the longitudinal edge of the first bar which prevents rotation of the keeper.

* * * * *